Dec. 10, 1968    N. A. L. WIKDAHL    3,415,375
METHOD AND APPARATUS FOR VORTICAL SEPARATION OF SOLIDS
Filed March 2, 1965    2 Sheets-Sheet 1

INVENTOR.
NILS ANDERS LENNART WIKDAHL
BY Haure and Wyrich
ATTORNEYS

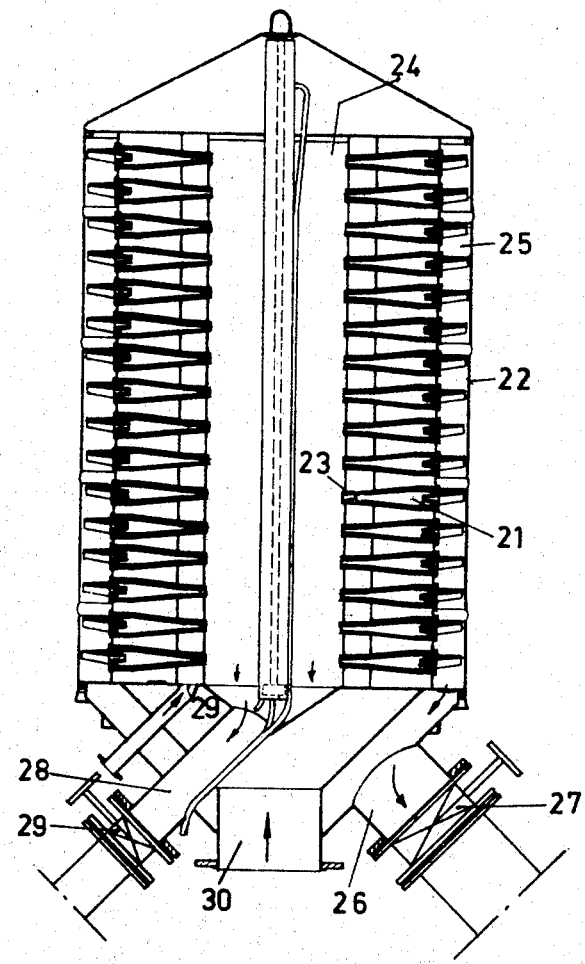

United States Patent Office 3,415,375
Patented Dec. 10, 1968

3,415,375
METHOD AND APPARATUS FOR VORTICAL SEPARATION OF SOLIDS
Nils Anders Lennart Wikdahl, 42 Bravallavagen, Djursholm, Sweden
Filed Mar. 2, 1965, Ser. No. 436,560
Claims priority, application Sweden, Mar. 5, 1964, 2,713/64
9 Claims. (Cl. 209—211)

ABSTRACT OF THE DISCLOSURE

Hydrocyclone heavy fraction discharge compartment has radially inwardly extending members defining a constricted inlet and a constricted outlet. The compartment outlet end is submerged beneath the level of heavy fraction maintained in heavy fraction discharge collecting vessel and means maintain back pressure on the compartment outlet end.

---

The present invention relates to a method of separating a suspension into a light fraction and a heavy fraction in hydrocyclone separators and, more particularly, in a hydrocyclone separator unit or assemblage including a plurality of hydrocyclone separators, each of which comprise an elongated chamber of circular cross section having at one end a first outlet for the discharge of the light fraction and at the other end a second outlet for the discharge of the heavy fraction. The invention also relates to the structure of such hydrocyclone separators for effecting separation of the suspension in accordance with the method of the invention.

The separation efficiency of hydrocyclone separators generally depends, to a large extent, upon the dimensions and, more particularly, upon the effective flow areas of the discharge outlets for the light fraction commonly referred to as "accepts" and the heavy fraction commonly referred to as "rejects."

It is a general rule that the smaller the discharge outlet is for the rejects, the smaller will be the proportion of the accepts which are discharged through this outlet and thus lost. In respect of the rejects, the condition is the opposite to a certain extent, the smaller the discharge outlet is for the rejects, the larger will be the proportion of the rejects which are discharged through the discharge outlet for the accepts. In other words, the separation efficiency of the separator is correspondingly lowered. Accordingly, the problem is to select for the discharge outlet for the rejects an effective flow area which is dimensioned so that an optimal overall efficiency is attained as to both, the losses of accepts, such as fibers and the separation efficiency. Generally stated, particularly for multiple hydrocyclone installations in which the individual separators are usually quite small, the conditions for the aforestated overall optimal efficiency involve that, especially in view of the relatively low back pressure in the heavy fraction receptacle owing to the free outflow of the heavy fraction, the discharge outlet for the heavy fraction, or rejects, has to be provided with an effective flow area which is so small that there is a pronounced danger of clogging in this outlet. Such clogging, of course, completely stops the separating operation, or at least reduces the capacity of the separator to a substantial extent.

When separating suspensions in hydrocyclones and especially fiber suspensions, it has been considered practically axiomatic to provide a free outflow of the heavy fraction or rejects from the hydrocyclones because it was deemed to be necessary to be able to follow the separation operation and immediately to take any measures possibly required. This request remained also when hydrocyclone separator units became available, the separators of which were enclosed in a common housing and it was therefore necessary to provide such units with special automatic rinsing or flushing means for the reject outlet nozzles to prevent clogging. The equipment necessary to effect such automatic rinsing or flushing is, however, rather complicated and expensive and it has been found that the use of anticlogging equipment introduces difficult problems, especially in the operation of multicyclone installations as, for instance, when an outlet is clogged immediately after a flushing has taken place and hence will be clogged during the whole period before next flushing.

In some fields of application, such as an installation in which hydrocyclone separators are used ahead of a papermaking machine, the use of special rinsing or flushing equipment is not possible at all and hence also not the use of separators which satisfy the aforementioned optimal operational conditions since the rinsing or flushing, which is carried out periodically at selected time intervals, causes fluctuations in the flow of accepts discharged from the hydrocyclone separator. In connection with the making of paper, no fluctuations at all in the flow of the suspension can be tolerated.

It has previously been proposed to discharge the heavy fraction through the respective outlet of a conventional hydrocyclone separator into a receiving vessel above or below the operational liquid level in the vessel and to maintain a pressure elevated above atmospheric pressure in the receiving vessel. However, it has been found that tests made with such an arrangement are always disappointing, in that the separating efficiency and also the output of the separator are substantially reduced. As stated before, it is generally accepted by experts in the field that the heavy fraction must be freely discharged through the respective outlet of the separator; that is, the heavy fraction must be discharged at atmospheric pressure. In other words, it was found impractical to design a separator so that the aforestated favorable proportions are maintained at the outlet for the heavy fraction.

It is a broad object of the invention to provide a novel and improved method of operating a hydrocyclone separator apparatus so that the afore-outlined favorable proportions at the heavy fraction outlet of the separator can be maintained, without encountering the also afore-pointed out disadvantages of such proportions. For this purpose, a counter or back pressure is maintained in the discharge outlet for the heavy fraction, and the discharge outlet includes one compartment or several axially aligned compartments having constricted ingresses end egresses. A separator arranged in this manner makes it possible to use in the heavy fraction outlet nozzle a passage area which provides a high separation and fiber retention efficiency but is just large enough to prevent clogging of the nozzles, so that rarely, if ever, is it necessary to provide special rinsing or flushing means for the same. The vessel for accumulating the discharged heavy fraction is associated with the nozzle for the discharge of the heavy fraction, so that the same flows out directly into the vessel. The receiving vessel is preferably provided with means for keeping the pressure in the same at least substantially constant. For this purpose, an open vessel may be used, and the discharge end of the heavy fraction outlet is placed close to the bottom of this vessel. The operational liquid level in the vessel is then maintained at a level such that the static pressure of the liquid produces the required counter or back pressure. Instead of producing the counter pressure by the static pressure of a liquid column, the counter pressure may be obtained by providing a closed receiving vessel in which the pressure is elevated by a pressurized gas, such as air. The most suitable magnitude of the counter or back pressure varies for different separator installations and depends upon the special requirements and the purpose of each installation. The effect of the counter or back pressure upon the separating efficiency of the separator is apparent from the following examples. In one series of tests with a hydrocyclone separator according to the invention, counter or back pressures in the outlet nozzle for the heavy fraction were maintained at 0.5, 0.6 and 0.7 atmospheres gauge or above atmospheric pressure, respectively. The total cleaning efficiency was found to be 55%, 58% and 47%, respectively. In a second series of tests with the same separating apparatus, a cleaning efficiency of 68%, 71% and 75%, respectively, was obtained. In both series of tests the pressure in the hydrocyclone separator inlet for feeding the suspension to be separated was kept constant at 2.5 atmospheres gauge or above atmospheric pressure. In both series of tests a supply of action water was tangentially fed into the outlet for the heavy fraction, and more specifically into the constricted compartment or compartments therein, thereby correspondingly increasing the vortical flow through the compartments of the nozzle and thus increasing the recovery of fibers. The difference between the test results of the two series of tests is apparently due to the fact that in the first series the pressure of the supply of action water was 1.5 atmospheres gauge or above atmospheric pressure, and in the second series of tests, 2.0 atmospheres gauge or above atmospheric pressure.

The principal advantage of the method according to the invention and of separating apparatus or installations designed to carry out the method of the invention is that the invention permits a free selection of the range of pressure in which the separation is carried out. In other words, the pressure range used for the separation can be adapted to the pressure range within which preceding or succeeding operations are preferably carried out. For instance, a pump may be provided ahead of the hydrocyclone separator which imparts to the suspension to be separated a pressure such that both fractions, when discharged from the separator, are at the pressure required to force the respective fraction directly to and through one or more subsequent treatment stations, without subjecting the discharged fractions to a booster pressure.

When the material in suspension, due to its consistency or for other reasons, has a tendency to form agglomerations or lumps prior to reaching the outlet for the heavy fraction, there may be some risk that this outlet will become clogged, even in a separator designed and operated in accordance with the invention. To avoid clogging even under the most unfavorable conditions, the heavy fraction discharge outlet may be conveniently flushed by temporarily and abrupty releasing or reducing the counter or back pressure. When the suspensions to be separated are known to have such tendency to form lumps, the counter pressure may be reduced or otherwise released at predetermined time intervals. As is evident, a temporary reduction or release of the counter or back pressure will set up a pressure differential between the interior side and the exterior side of the outlet, thereby forcing any existing agglomerations or lumps through the outlet.

In the accompanying drawing, several embodiments of the invention are shown by way of illustration, and not by way of limitation.

In the drawing:

FIG. 4 is a longitudinal section of a diagrammatically illustrated hydrocyclone separator installation according to the invention, including a plurality of separators.

Figure 1:
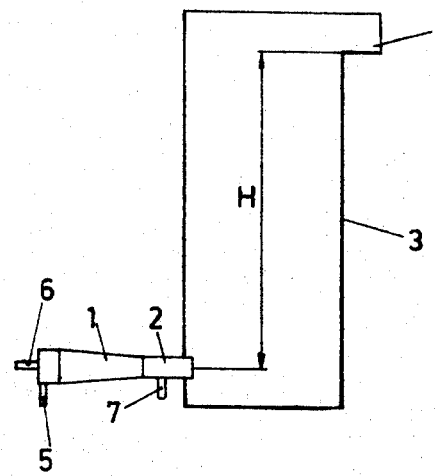
FIG. 1 shows diagrammatically a hydrocyclone separator apparatus according to the invention, the counter pressure being supplied by the static pressure of a liquid column formed by the discharged heavy fraction.

According to FIG. 1, the apparatus comprises a hydrocyclone separator 1, which in the discharge outlet for the heavy fraction is provided with a nozzle 2. The apparatus comprises also a receptacle or vessel 3, which is open at the top and has an overflow opening 4. The nozzle 2 issues into vessel 3 at the lower portion thereof, whereby a liquid column of the height H produces the desired counter or back pressure. The inlet of the separator is designated 5 and the outlet for the light fraction is designated 6. The nozzle 2 may be provided with a pipe connection 7 for supply of action liquid.

Figure 2:
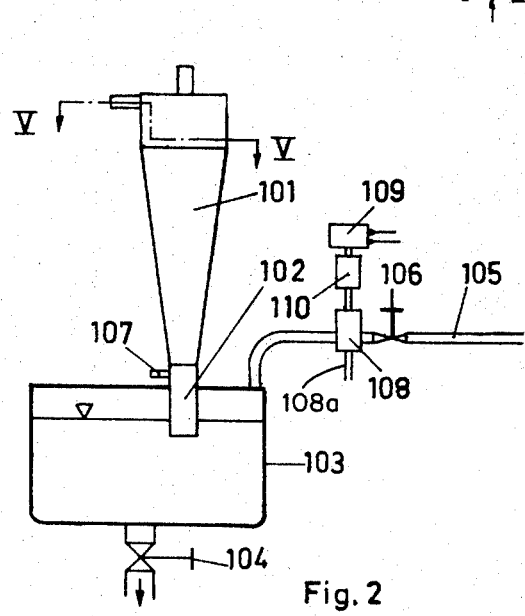
FIG. 2 shows diagrammatically a modification of a hydrocyclone separator apparatus according to the invention, in which the counter pressure is supplied by a pressurized fluid fed to a receiving vessel for the discharged heavy fraction.

In the apparatus according to FIG. 2, an outlet 102 for the heavy fraction of a separator 101 issues into a closed receptacle or vessel 103 which has a bottom outlet duct including an adjustable conventional valve 104. The upper portion of the vessel contains a gas, for instance, air, under pressure and is, by means of a pipe line 105 and an adjustable conventional valve 106, connected to a source of pressurized gas or air. The heavy fraction outlet nozzle 102, which may have a pipe connection 107 for supply of action liquid, issues into the lower part of the vessel, said part containing separated heavy fraction. Two or more separators 101 may be connected to one and the same vessel 103.

Figure 3:
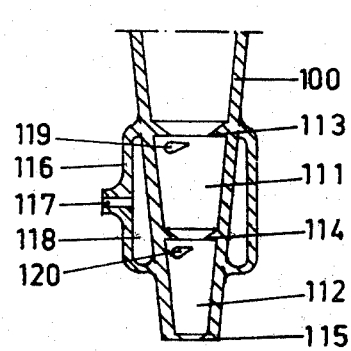
FIG. 3 is a lengthwise section through an outlet nozzle for the heavy fraction, suitable for use with separators according to the invention.

The heavy fraction discharge nozzles 2 and 102 may be of the kind shown in FIG. 3. The nozzle according to this figure is integral with the body proper 100 of the separator and includes two series-coupled conical chambers 111, 112 defined by throttling means, including flanges or lips 113, 114, 115 defining apertures, the free flow area of which decreases in the direction of the flow. By providing the nozzle with one or more chambers accordingly defined by throttling means, it is possible to obtain effective separation in the hydrocyclone separator even though the nozzle discharges into the liquid or suspension below the liquid surface in the vessel, there being no risk that this liquid or suspension will be sucked back into the separation chamber of the hydrocyclone separator and thus cause a deterioration of the separation action.

The chambers 111 and 112 may be cylindrically shaped and be of the same diameter, or the diameter may decrease in the direction of the flow.

The nozzle is surrounded by a jacket 116 with an inlet opening 117 for supply of action liquid to an annular space 118 between the jacket 116 and the body wall 100. Tangentially arranged apertures 119, 120 in the wall 100 form communications between the space 118 and the nozzle chambers 111, 112, respectively.

Other embodiments of the nozzle may also be used within the scope of the invention. For instance, the nozzle may be of the kind shown and described in U.S. Patent No. 3,039,608, wherein the nozzle chambers are formed of detachable insertions arranged in a common housing and provided with apertures for supply of action water from a space between said insertions and said housing.

As shown in FIG. 4, the invention also encompasses an installation 5 comprising a plurality of hydrocyclone separators 21 radially arranged in several layers in a common housing 22, as described in copending U.S. patent application Ser. No. 137,809, filed Sept. 13, 1961 and issued as Patent 3,261,467 on July 19, 1966. The heavy fraction discharge nozzles 23 of the hydrocyclone separators discharge into a central chamber 24, which is kept filled with heavy fraction at least to such a level that all nozzles are immersed in the liquid.

The chamber 24 is preferably closed against the ambient atmosphere. Its upper portion may be connected by a pipe to a source of pressurized gas or air. The receiving chamber 25 for the light fraction is kept filled with light fraction which is discharged through an outlet pipe 26 including an adjustable valve 27. The heavy fraction is discharged from the central chamber 24 through an outlet pipe 28, including an adjustable valve 29, respectively. The counter pressures in the chambers 24 and 25 balance each other and may be easily adjusted to the desired values by means of the valves 29 and 27, respectively. In this manner, it is possible to maintain at a pressure of, for instance, 2.5 kg./cm.$^2$ in the inlet 30 of the assembly and a pressure of 1.5 kg./cm.$^2$ and 1.3 kg./cm.$^2$, respectively, in the outlets 26 and 28.

According to the invention, it is also possible to effect a rinsing or flushing of the nozzles for the heavy fraction by temporarily reducing the pressure in the vessel 103 of the apparatus according to FIG. 2 or in the central chamber 24 of the installation according to FIG. 4. Such pressure reductions may be obtained by increasing the flow passages in the valves 104 and 29, respectively. The pressure reductions may be effected periodically at varying or constant predetermined time intervals and may be automatically controlled. To that end, the valves may, for instance be actuated electrically by a conventional timer switch which energizes, at periodic time intervals, a solenoid to operate the valve against the action of a spring and then deenergizes the solenoid for return of the valve to its normal open position.

As shown in FIG. 2, the pipe 105 may be provided with a three-way valve 108, a timer switch 109 and a solenoid 110. The timer switch 109 periodically energizes the solenoid 110 which, in turn, actuates the three-way valve 108 to throttle or close the connection between the vessel 103 and a source of pressurized gas and, at the same time, to open a pipe connection 108a between the vessel and the atmosphere. After a predetermined period of time, the timer switch deenergizes the solenoid and the three-way valve returns to its normal position in which the connection between the vessel 103 and the source of pressurized gas is restored and the connection between the vessel and the atmosphere is shut off Such periodic pressure reductions prevent effectively, especially in conjunction with elastic nozzles of rubber or similar material, any clogging of the heavy fraction outlets of the hydrocyclone separators.

Figure 5:
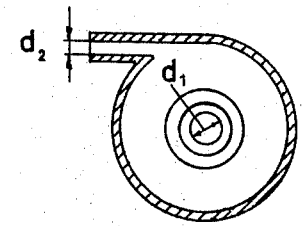
FIG. 5 is a sectional view taken on line V—V of FIG. 2 on an enlarged scale.

As shown in FIG. 5, the diameter $d_1$ of the narrowest flow area of the heavy fraction nozzle is preferably greater than the diameter $d_2$ of the cyclone inlet area, thereby preventing particles of a size larger than the nozzle outlet will pass, to enter the hydrocyclone separator and thereby cause clogging of said outlet.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A method of separating a suspension into a light fraction and a heavy fraction in a hydrocyclone separator including a chamber having an outlet for the light fraction and an outlet for the heavy fraction, the heavy fraction outlet of the cyclone including at least one compartment within which means extend radially inwardly to define a constricted ingress and a constricted egress for the compartment, said method comprising the operational steps of discharging under pressure the heavy fraction through said outlet into a receiving vessel, maintaining the discharge pressure of the heavy fraction at a predetermined pressure value by applying to the heavy fraction in the vessel a predetermined pressure and maintaining the operational level of the heavy fraction in the vessel above the level at which said outlet for the heavy fraction discharges, and discharging the heavy fraction accumulating in the vessel from the same.

2. The method according to claim 1 and further comprising the step of intermittently and abruptly reducing said predetermined pressure applied to the heavy fraction in the vessel, thereby intermittently flushing said heavy fraction outlet.

3. The method according to claim 2, wherein said predetermined pressure applied to the heavy fraction in the vessel is reduced at predetermined time intervals.

4. A hydrocyclone separator assemblage for separating a suspension into a light fraction and a heavy fraction, said assemblage comprising at least one hydrocyclone separator including a chamber having an inlet for feeding suspension into said chamber, an outlet for the light fraction and an outlet for the heavy fraction including a compartment, means radially inwardly extending within the compartment and defining a constricted ingress and a constricted egress for the compartment, a receiving vessel for the heavy fraction, said heavy fraction outlet extending into said vessel to discharge therein, means for maintaining an operational level of discharged heavy fraction in the vessel above the discharge end of the heavy fraction outlet, and pressure means for maintaining the discharged heavy fraction in the vessel at a predetermined pressure.

5. An assemblage according to claim 4, wherein said pressure means comprise a closed receiving vessel, and means for feeding pressurized fluid into said vessel to elevate the atmospheric pressure therein to a pressure corresponding to said predetermined pressure.

6. An assemblage according to claim 4 and comprising pressure control means coacting with said pressure means for reducing said predetermined pressure at predetermined time intervals.

7. A hydrocyclone separator assemblage for separating a suspension into a light fraction and a heavy fraction, said assemblage comprising at least one hydrocyclone separator including a chamber having an inlet for feeding suspension into said chamber, an outlet for the light fraction and an outlet for the heavy fraction, said heavy fraction outlet including several axially aligned compartments, means radially inwardly extending within each compartment and defining a constricted ingress and a constricted egress for each compartment, a receiving vessel for the heavy fraction, said heavy fraction outlet extending into said vessel to discharge therein, means for maintaining in said vessel an operational level of the discharged heavy fraction in the vessel above the discharge end of the heavy fraction outlet, and pressure means for maintaining the discharged heavy fraction in the vessel at a predetermined pressure.

8. A method of separating a suspension into a light fraction and a heavy fraction in a hydrocyclone separator including a chamber having an outlet for the light fraction and an outlet for the heavy fraction, the heavy fraction outlet of the cyclone including at least one compartment within which means extend radially inwardly to define a constricted ingress and a constricted egress for the compartment, said method comprising the operational steps of discharging under pressure the heavy fraction through the said outlet into a receiving vessel, maintaining the discharge pressure of the heavy fraction at a predetermined pressure value by applying to the heavy fraction in the vessel a predetermined pressure and discharging the heavy fraction accumulating in the vessel from the same.

9. A hydrocyclone separator assemblage for separating a suspension into a light fraction and a heavy fraction, said assemblage comprising at least one hydrocyclone separator including a chamber having an inlet for feeding suspension into said chamber, an outlet for the light fraction and an outlet for the heavy fraction including a compartment, means extending radially inwardly within said compartment and defining a constricted ingress and a constricted egress for the compartment, a receiving vessel for the heavy fraction, said heavy fraction outlet extending into said vessel to discharge therein, and means for maintaining an operational level of discharged heavy fraction in the vessel above the discharge end of the heavy fraction outlet.

References Cited

UNITED STATES PATENTS

| | | | |
|---|---|---|---|
| 2,756,878 | 7/1956 | Herkenhoff | 209—211 |
| 2,953,248 | 9/1960 | Troland | 209—211 X |
| 3,039,608 | 6/1962 | Wikdahl | 209—211 |
| 3,214,022 | 10/1965 | Wikdahl | 209—211 X |
| 3,252,574 | 5/1966 | DeKoning | 209—457 |
| 2,835,387 | 5/1958 | Fontein | 209—211 |

FOREIGN PATENTS 693,649  7/1953  Great Britain.

FRANK W. LUTTER, *Primary Examiner.*